United States Patent [19]

Woltron et al.

[11] 4,066,500
[45] Jan. 3, 1978

[54] GRID LATTICE STRUCTURE

[75] Inventors: Klaus Woltron, Ternitz; Peter Stuckler, Wiener Neustadt, both of Austria

[73] Assignee: Schoeller-Bleckmann Stahlwerke Aktiengesellschaft, Vienna, Austria

[21] Appl. No.: 524,891

[22] Filed: Nov. 18, 1974

[30] Foreign Application Priority Data

Nov. 16, 1973 Austria .................................. 9641/73

[51] Int. Cl.² ............................................... G21C 3/34
[52] U.S. Cl. ........................................ 176/78; 176/61; 248/68 R; 52/650; 52/652
[58] Field of Search .................. 176/76, 78, 50, 61, 176/64; 52/648, 650, 651, 652, 662; 248/49, 68 R

[56] References Cited

U.S. PATENT DOCUMENTS

| | | | |
|---|---|---|---|
| 3,053,358 | 9/1962 | Gross | 248/49 X |
| 3,223,378 | 12/1965 | Bennett | 52/650 X |
| 3,457,140 | 7/1969 | Glandin | 176/76 X |
| 3,598,349 | 8/1971 | Drake | 248/68 R |
| 3,769,771 | 11/1973 | Shannon et al. | 52/683 |
| 3,772,148 | 11/1973 | Seddon | 176/76 X |
| 3,791,466 | 2/1974 | Patterson | 176/78 |
| 3,802,995 | 4/1974 | Fritz et al. | 176/79 X |
| 3,940,314 | 2/1976 | Knodler et al. | 176/78 |

*Primary Examiner*—Peter A. Nelson
*Attorney, Agent, or Firm*—Karl F. Ross

[57] ABSTRACT

A grid structure for the support of elongate objects, such as boxes containing the fuel elements of a nuclear reactor, comprises several parallel metal plates with machined, aligned apertures receiving the boxes, the plates being interconnected by transverse stays secured thereto preferably by welding. In the case of square or otherwise rectangular apertures, the residual plate material forms an orthogonal array of narrow strips whose intersections are the anchor points for the stays.

5 Claims, 2 Drawing Figures

GRID LATTICE STRUCTURE

FIELD OF THE INVENTION

Our present invention relates to a grid structure for the support of elongate objects, specifically boxes containing the fuel elements of a nuclear reactor.

BACKGROUND OF THE INVENTION

Fuel-element containers of nuclear reactors are frequently supported in a metallic grid consisting of orthogonally intersecting bars, the containers being clamped between these bars (usually in an upright position) with the aid of a surrounding frame. In such reactors, which may be of the pressure-gas or the boiling-water type, very accurate tolerances must be observed as far as both the dimensions of the grid apertures and the parallelism and linearity of the bars is concerned. With grids measuring several meters in diameter, the weight of the structure may exert a distorting influence upon the bars. The assembly of such grids, moreover, is relatively laborious since precise mechanical interfitting of the parts is required and simpler techniques such as welding are excluded in view of the risk of thermal deformations.

OBJECT OF THE INVENTION

The object of our present invention, therefore, is to provide an improved and more easily assembled structure of this character.

SUMMARY OF THE INVENTION

We realize this object, pursuant to our present invention, by the provision of a plurality of parallel metal plates with aligned apertures closely spaced in each plate, the plates being held at a fixed distance from one another by a set of transverse stays secured to the plates at locations offset from their apertures, preferably by welding.

The apertures of each plate can be precisely dimensioned by a conventional machining process, with the aid of a suitable template, and are preferably of a thickness substantially exceeding the width of the metal portions remaining between the apertures. If these apertures are of rectangular (e.g. square) configuration, the stays are advantageously located at the intersections of the orthogonal array of bars formed by the residual plate portions.

BRIEF DESCRIPTION OF THE DRAWING

The above and other features of our invention will now be described in detail with reference to the accompanying drawing in which.

SPECIFIC DESCRIPTION

Figure 1:
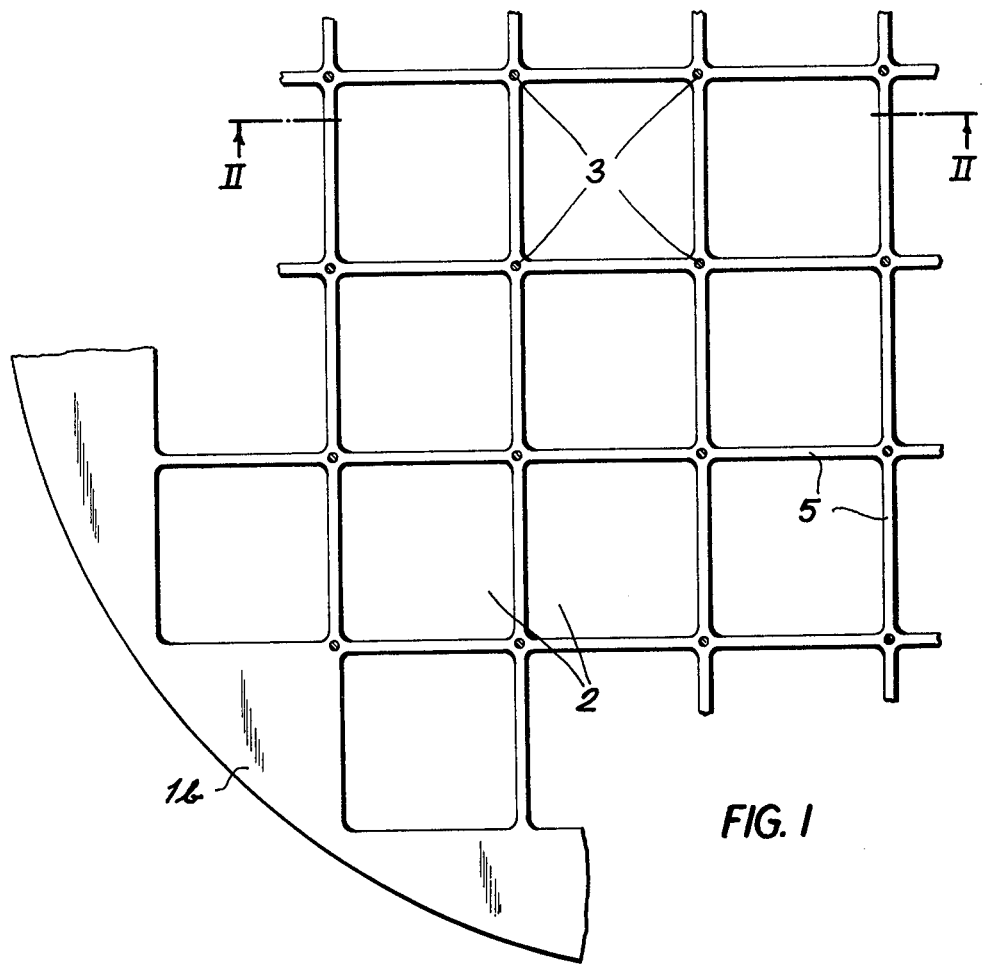
FIG. 1 is a fragmentary sectional top view of a grid structure embodying our invention.

The grid structure shown in the drawing comprises a pair of parallel metal plates 1a and 1b of identical shape, each provided with a multiplicity of square apertures 2 which may be formed therein by casting and subsequent machining to final tolerances. The apertures are separated by residual metal portions 5 constituting an orthogonal array of narrow strips, the plates being spaced apart by metallic stays 3 welded thereto at the intersections 4 of the strips 5. The stays 3 may be round rods, flat bars or profiles of any suitable cross-section.

Figure 2:
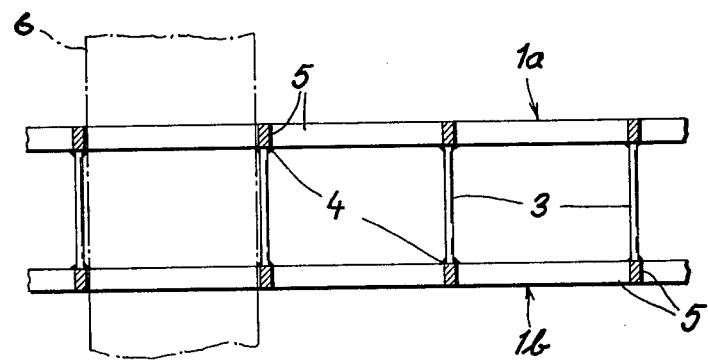
FIG. 2 is a cross-sectional view taken on the line II—II of FIG. 1.

Box-shaped containers 6 for fuel elements of a nuclear reactor may be lodged in the aligned apertures 2 as diagrammatically illustrated in FIG. 2.

An assembly of two or more such spaced-apart plates, permanently interconnected at all or most of their intersections by rigid stays 3, does not require additional steadying by a surrounding frame and resists mechanical as well as thermal deformation. Though we prefer welding, the stays could also be fastened to the plates by screw threads, press fits or other mechanical connections.

We claim:

1. In a nuclear reactor, in combination:
   a plurality of substantially nondeformable parallel metal plates each forming an integral orthogonal array of strips defining between them a multiplicity of apertures whose dimensions substantially exceed the width of said strips, the apertures of all said plates being aligned with one another to seat a bank of elongate fuel-element containers transverse to said plates; and
   a set of rigid stays transverse to said plates aligned with said strips and secured thereto for holding said plates at a fixed distance from one another.

2. The combination defined in claim 1 wherein said apertures are of rectangular configuration and identical size, said stays being located at the intersections of said strips.

3. The combination defined in claim 2 wherein the width of said strips is less than the thickness of said plates.

4. The combination defined in claim 2 wherein said stays are secured to said intersections by weld joints.

5. In a nuclear reactor, in combination:
   a plurality of substantially nondeformable parallel metal plates each forming an integral orthogonal array of strips defining between them a multiplicity of apertures whose dimensions substantially exceed the width of said strips, the apertures of all said plates being aligned with one another to form seats for elongate objects;
   a set of rigid stays transverse to said plates aligned with said strips and secured thereto for holding said plates at a fixed distance from one another; and
   a bank of elongate fuel-element containers respectively lodged in said seats.

* * * * *